Dec. 16, 1969 R. H. G. RAINE 3,484,055

INFORMATION RETRIEVAL SYSTEM

Filed May [illegible], 1968 7 Sheets-Sheet 1

Inventor
Roydon Henry Geary Raine
BY Watson, Cole, Grindle & Watson
Attorneys

Inventor
Roydon Henry Gurney Raine
BY Watson, Cole, Grindle & Watson
Attorneys

Dec. 16, 1969 R. H. G. RAINE 3,484,055

INFORMATION RETRIEVAL SYSTEM

Filed May 1, 1968 7 Sheets-Sheet 3

Inventor
Raymond Henry George Raine
By Watson, Cole, Grindle & Watson
Attorneys

Inventor
Raglan Henry George Raine
By Watson, Cole, Grindle & Watson
Attorneys

INFORMATION RETRIEVAL SYSTEM

Filed May 1, 1968 7 Sheets-Sheet 5

Inventor
Raydon Henry Gurney Raine
By Watson, Cole, Grindle & Watson
Attorneys

Dec. 16, 1969 R. H. G. RAINE 3,484,055

INFORMATION RETRIEVAL SYSTEM

Filed May 1, 1968 7 Sheets-Sheet 6

Inventor
Roydon Henry Gurney Raine
BY Watson, Cole, Grindle & Watson
Attorneys

Inventor
Roydon Henry George Raine
BY Watson, Cole, Grindle & Watson
Attorneys 3,484,055

INFORMATION RETRIEVAL SYSTEM

Roydon Henry Gurney Raine, Deptford, London, England, assignor to Molins Machine Company Limited, London, England, a corporation of Great Britain Filed May 1, 1968, Ser. No. 725,822
Claims priority, application Great Britain, May 5, 1967, 21,110/67
Int. Cl. G11b *15/32, 25/06;* G03b *1/04*
U.S. Cl. 242—181 8 Claims

ABSTRACT OF THE DISCLOSURE

Information retrieval system having a random access tape cassette storage drum from and into which selected cassettes may be ejected and replaced after identification by means on each cassette identified by selection means. After ejection into a rotatable transfer means, the tape in a cassette is sequentially tensioned, or rewound to the start position and then tensioned, played, rewound and finally returned to the random storage drum by rotational positioning adjacent a tensioning/rewind device and a tape playing deck. Random ejection and return means are associated with the identifying means and positioned adjacent the ejection position.

This invention relates to information retrieval systems and more particularly, to mechanism for storing a plurality of tape cassettes, each with a unique distinguishing feature and for retrieving and loading onto a tape deck any predetermined one of the cassettes. Such mechanism will hereinafter be referred to as "tape cassette retrieval mechanism."

According to the present invention there is provided tape cassette retrieval mechanism comprising a drum for carrying a plurality of tape cassettes substantially radially disposed on its outer annulus; a transfer mechanism having two cassette carriers and mounted for rotation adjacent to said drum to bring either cassette carrier into a loading position at which a cassette can be transferred between it and the drum while the other carrier is at a playing position adjacent to a tape deck; loading means to transfer a cassette between the cassette carrier at the loading position and the drum; recognition means for detecting and/or identifying any predetermined one of the distinguishing features on the cassettes; means to rotate said drum to bring each cassette in turn past said recognition means; mechanism operable on detection and/or recognition of a predetermined distinguishing feature by said recognition means to stop the drum with the cassette bearing the required feature at the loading position and operable on said loading means to transfer the cassette onto the carrier at the loading position; tape tensioning means at the loading position to tension the tape in the cassette after transfer on to the carrier; means at the playing position selectively operable to bring together, or to separate, the tape deck and the cassette on the carrier at that position; means to index the transfer mechanism after tensioning of the tape in the last loaded cassette and playing of the tape at the playing position to transpose the cassette carriers; and rewind means at the loading position to rewind the tape in the cassette prior to transfer of the cassette into the drum.

A number of embodiments of the invention will now be described by way of example with reference to the accompanying drawings, of which:

Figure 1:
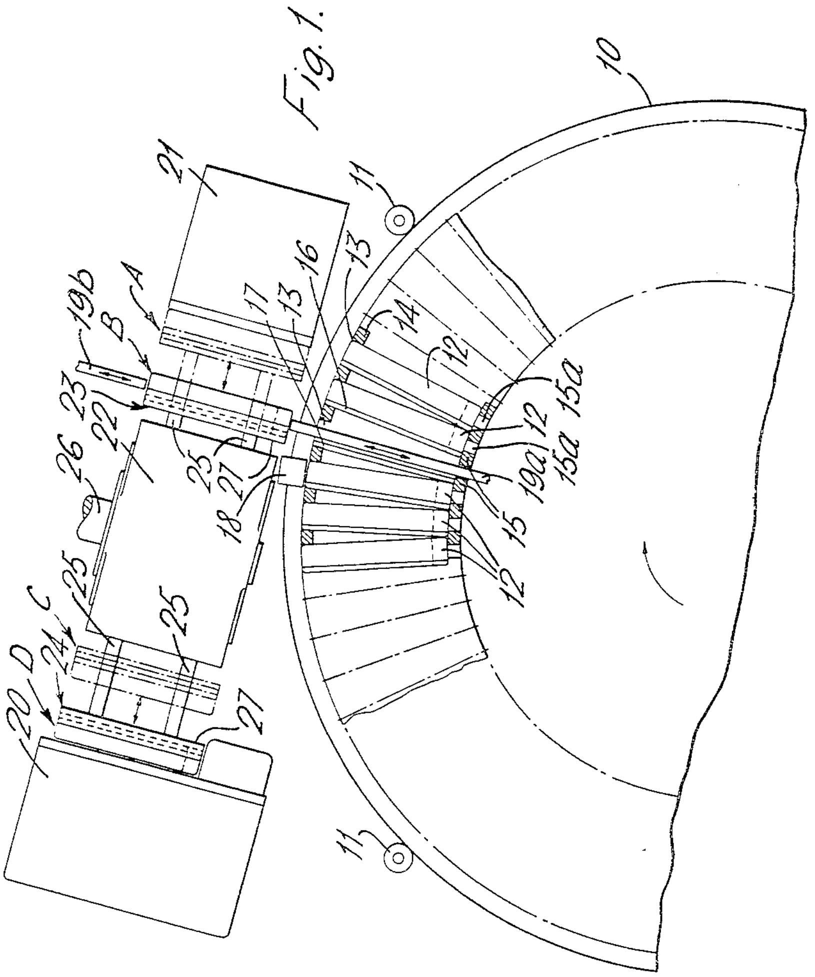
FIGURE 1 is a side elevation of the first embodiment.
Figure 2:
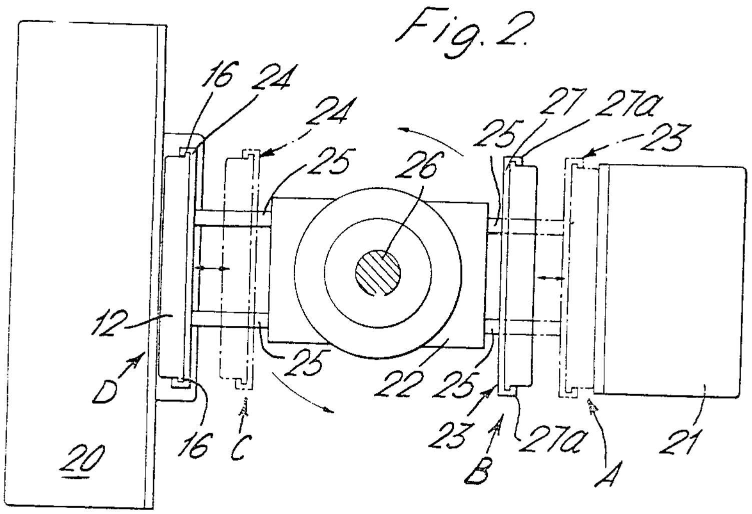
FIGURE 2 is a plan view of part of the apparatus of FIGURE 1.

In FIGURE 1 there is shown the upper part of an annular drum composed of two co-axially disposed cylindrical members. Two rollers 11 are shown in contact with the upper periphery of the drum which rests on two other similar rollers (not shown). The two bottom rollers are driven in known manner to rotate the drum and the four rollers engage with the drum to keep it in position, i.e. to locate it in the direction perpendicular to the plane of the figure. A plurality of cassettes 12 each containing a data bearing magnetic or other tape are carried in positioning slots in the drum disposed slightly offset from radial planes. The cassettes are placed in the drum by each being slid substantially radially inwards from the outer periphery through one of a series of apertures 13 in the outer cylindrical surface 14 of the drum. The inner ends of the cassettes rest against the inner cylindrical surface 15 of the drum which is provided with another series of smaller apertures 15*a* each of which exposes part of the inner face of one of the cassettes. Referring to FIGURE 2 a plan view of a cassette is shown in broken line at position C. Each cassette 12 has a rib 16 extending along each side surface, one of which is shown in FIGURE 1, and the structure of the drum provides radial recesses 17 along which the ribs 16 slide in order to position the cassette in the slot in the drum. Each cassette carries a unique identifying feature on its outer face in the form of a binary number and a stationary read head for reading these numbers is provided at 18. Any suitable manner of providing the binary numbers and any suitable form of read head for reading them may be employed. In the particular embodiment now being described the binary numbers are provided by a series of blocks which project from the outer end of the cassettes and which may be varied in number and position up to a maximum of eighteen, for example. Each block position has a corresponding microswitch situated in the read head and operable only by the presence of a correspondingly positioned block. It will be appreciated that by varying the number and positions of blocks different combinations of microswitches will be operated and if eighteen positions are used many tens of thousands of different cassettes can be identified.

Alternatively, magnetized blocks may be used and miniature reed relays positioned in place of the microswitches. In this event the presence or absence of a particular magnetized block will cause the energization or otherwise of the related reed relay.

It has been found in practice that some sixty cassetts per drum makes the apparatus of convenient size and also allows any suitable program to be obtained without changing the drums when it is borne in mind that each cassette contains sufficient tape for some thirty minutes of operation.

The drum is rotated by the rollers 11 in the clockwise direction as used in FIGURE 1 to bring the identifying device of each cassette past the read head in turn until the required cassette is identified. When that occurs the drum is brought to rest by apparatus (not shown) with the required cassette at a loading and unloading position or station where the cassette can be ejected from the drum. For the purpose a plunger 19*a* positioned within the drum and operating through apertures 15*a* is provided at the loading station to extend coaxially through a cassette slot. A further plunger 19*b* positioned outside the drum and also acting co-axially with a cassette slot is used for moving a cassette in the opposite direction i.e. for returning a cassette to the drum at the loading station. Any convenient method of operating the plungers may be employed, that is, it has been found convenient in the present embodiment to use co-axial solenoids in order to extend and retract the plungers, if found necessary spring means may be employed to return the plungers to the non-operative positions.

Above the drum 10 are a tape playing deck 20 and a tape tensioning and rewinding mechanism 21, and between these members is a cassette transfer mechanism 22 having two identically similar cassette carriers 23 and 24. The cassette carriers 23 and 24 are each mounted on four rods 25, which are extendable and retractable radially with respect to the axis of a shaft 26 carrying the transfer mechanism. The axis of said shaft 26 is at right angles to the axis of the drum 10. Each of the cassette carriers 23, 24 comprises a plate 27 with two opposed inturned edges 27*a* to provide opposed recesses to receive the ribs 16 on the sides of a cassette. The transfer mechanism 22 is rotatable in the anti-clockwise direction as shown in FIGURE 2 to bring each of the cassette carriers 23, 24 in turn adjacent to the tape tensioning/rewind device 21 and the tape playing deck 20.

The cassette carriers each have a retracted and an extended position in relation to the shaft 26 and also each have two operative locations based 180° apart; one location being at, or adjacent to, the tape playing deck 20 and the other at, or adjacent to, the tape tensioning/rewind device 21. Thus each cassette when carried by the transfer mechanism 22 can be in any of the four positions indicated by the arrows A, B, C and D.

The operation of the mechanism is as follows:

When a particular tape is required the drum 10 is rotated until the required cassette is identified by the read head 18 whereupon the drum stops with that cassette in the position shown occupied by the plungers 19*a* and 19*b* in FIGURE 1.

In the event that the required cassette is not available in the drum installed in the apparatus an indicator light (not shown) is illuminated and the drum ceases to rotate shortly after one complete revolution.

The cassette carrier 23 or 24 which is at the loading position will previously have been retracted from position A to position B. The plunger 19*a* then moves substantially radially outwards to eject the required cassette and transfer it to the carrier, the recesses in the carrier formed by the inturned edges 27*a* being radially in line with the ribs 16 on the cassette so that the cassette slides into the carrier. The rods 25 are then extended to move the carrier to position A at which position the tape spools in the cassette are engaged by spindles (not shown) in the device 21. Under the control of an interlock mechanism (not shown) the spindles rotate slightly in opposite directions in order to tension the tape. The carrier is then moved back to position B and the transfer mechanism is rotated through 180° to bring the carrier to position C. The rods 25 are extended to bring the carrier and cassette to position D. At this position the cassette is in the playing position on the tape playing deck 20, the tape being adjacent to the play head on the tape deck and its spools engaged by spindles (not shown) of the tape deck. When ancillary equipment requires, the tape is set in operation and while the tape is running through the play head on the tape deck any cassette which was previously at the tape deck is now at the loading position where it is first moved from position B to position A for its tape to be rewound by the device 21 which now rotates its spindles in the same direction in order to rewind the tape. After the tape has been rewound the cassette is then returned to position B by a retraction of the rods 25 and is pushed by the plunger 19*b* into the space in the drum from which the cassette now at the tape playing deck 20 was ejected as described above. The drum 10 is then rotated until the next required cassette is detected by the read head 18 whereupon, as before, the drum is stopped and the required cassette ejected by the plunger 19*a* into the now empty carrier at position B. As described above, the carrier is moved to position A for its tape to be tensioned by device 21 and is then returned to position B. After this has occurred, and when the tape in the cassette at the tape playing deck has run through the play head, the cassette at the tape deck is retracted from position D to position C (the cassette at the loading position already being at position B; this being assured by the speed of the rewind device being faster than the speed of the tape playing deck) and the transfer mechanism 22 is then rotated through 180°. As described above, the cassette now at position C is moved to position D for its tape to be run through on the tape playing deck 20 and the cassette now at position B is moved to position A to be rewound at a speed greater than the playing speed and is then returned to position B to be pushed by the plunger 19*b* into the vacant slot in the drum 10 previously occupied by the cassette now at the tape playing deck. The drum 10 is rotated and the next required cassette is ejected into the empty carrier at the position B and after tensioning at position A is returned to position B to await the next 180° rotation of the transfer device to bring it to the tape deck. Thus, while a tape is being played at the tape deck, the previous tape to be played is rewound at a greater speed, then pushed into the drum. The drum is then rotated and the next cassette is ejected into the empty carrier and is tensioned ready for transfer to the tape playing deck.

It will be appreciated that the cycle of operations is controlled such that the playing time of any cassette which may be termed the operational period is greater than the cycling time comprising the rewinding of a previous cassette, the return of that cassette to the drum, the rotation of the drum and the selection and ejection of the next cassette and its subsequent pre-tensioning ready for transfer to the tape playing deck even if the required cassette is not in the particular drum in use and drums have to be exchanged, or cassettes exchanged in a given drum.

Figure 3:
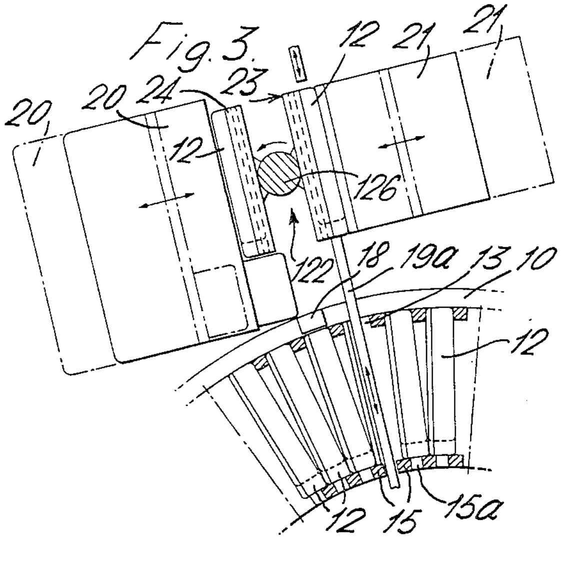
FIGURE 3 is a side elevation of a second embodiment.
Figure 4:
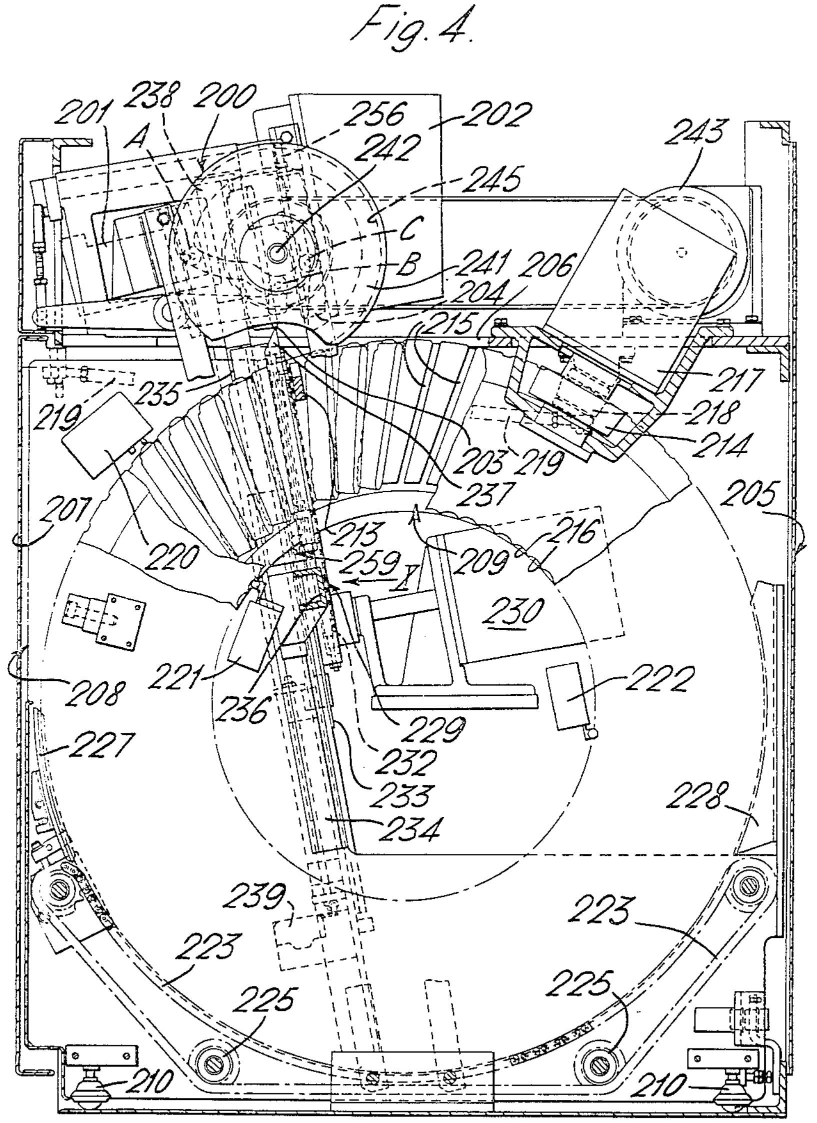
FIGURE 4 is a side elevation of a third embodiment partly in section.
Figure 5:
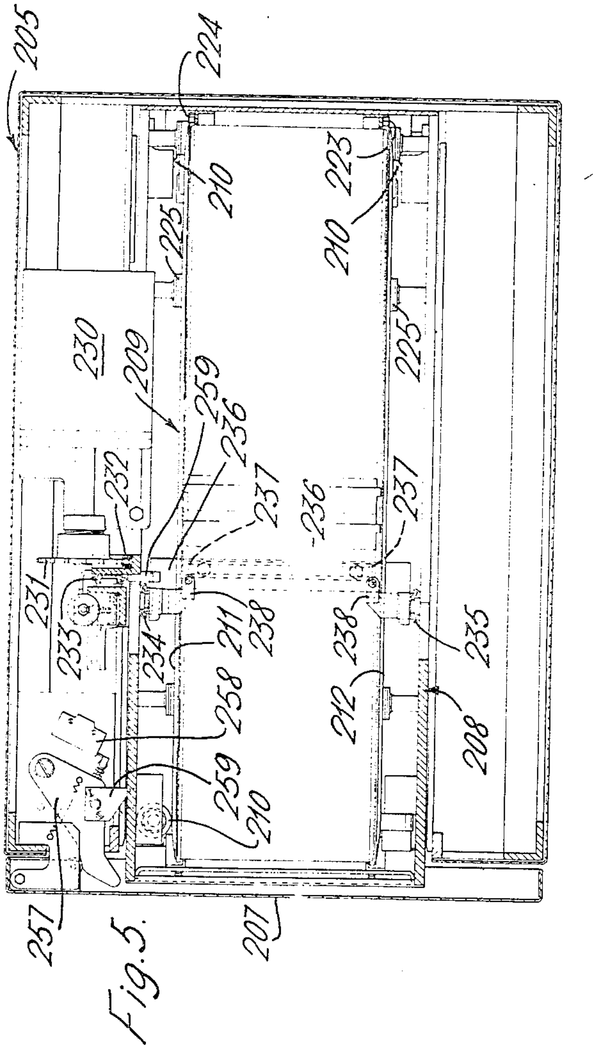
FIGURE 5 is a sectional plan view of the lower compartment of FIGURE 4.
Figure 6:
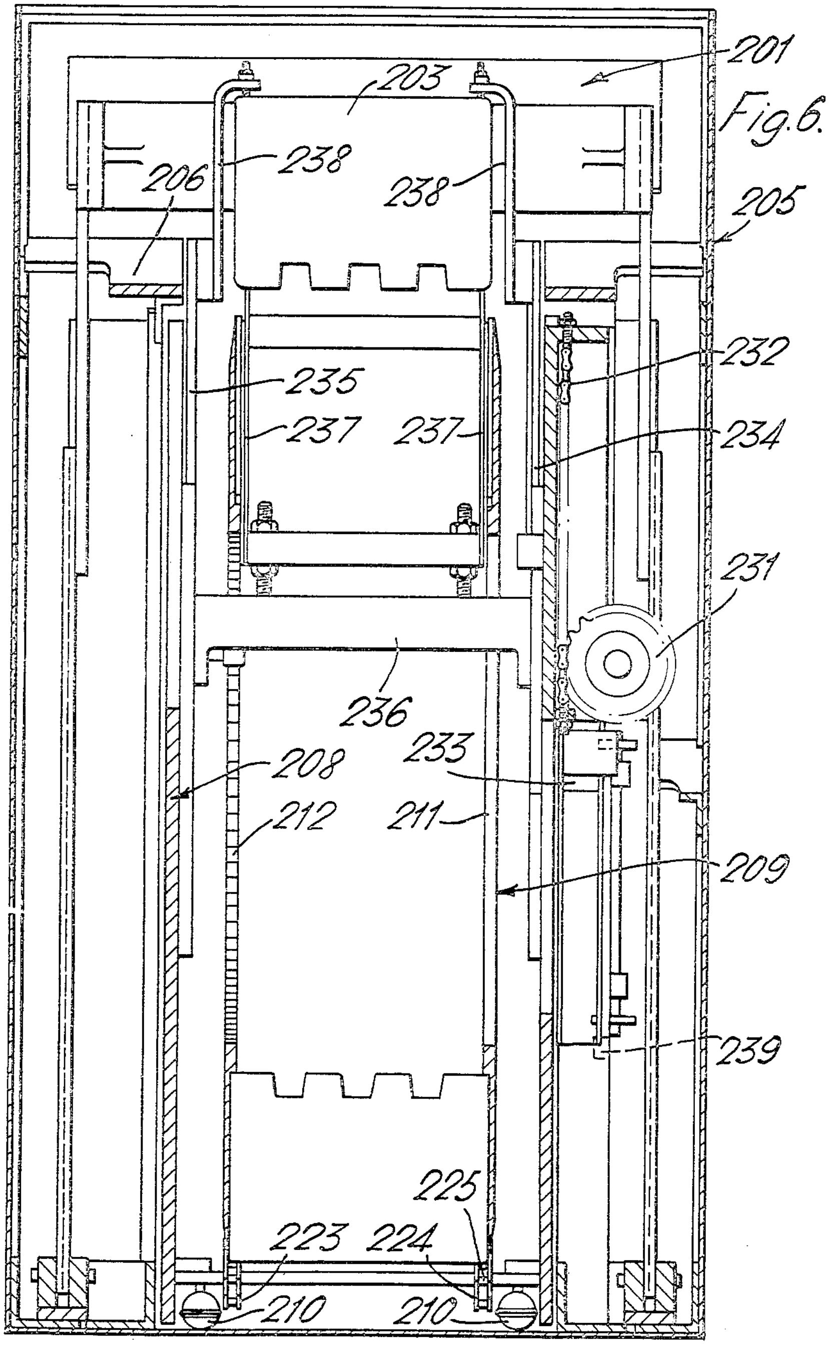
FIGURE 6 is a sectional view in the direction of arrow X of FIGURE 4.
Figure 7:
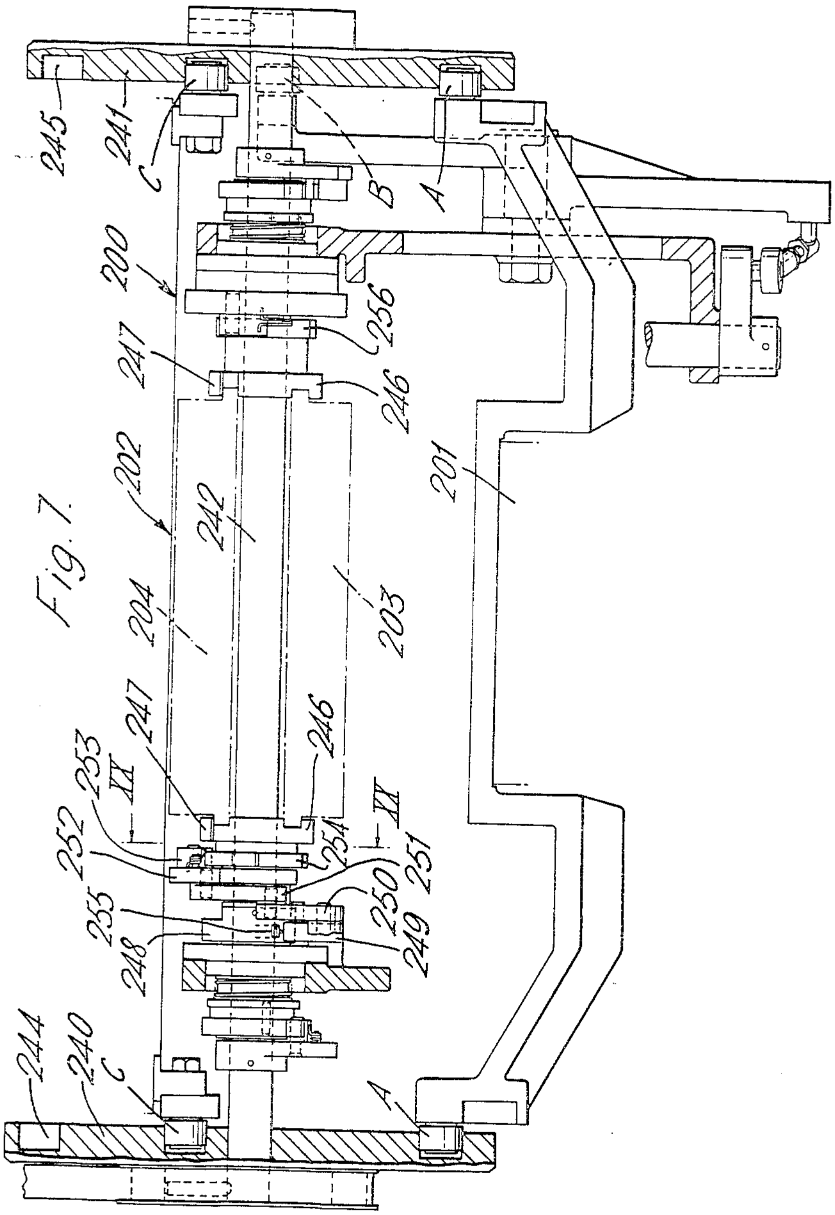
FIGURE 7 is a sectional plan view of the transfer mechanism.

A second embodiment of the invention is shown in FIGURE 3. In this embodiment the drum 10, the plungers 19*a* and 19*b* and the tape playing deck 20 and tensioning/rewind device 21 are the same as previously described. The transfer device is shown at 122 and has cassette carriers 23 and 24 which are also the same as in FIGURES 1 and 2 but are not extendable from and retractable towards the axis of the shaft 126 of the transfer device but are carried at fixed positions relative to the shaft. The differences over the embodiment of FIGURES 1 and 2 are (a) that the axis of the shaft 126 instead of being in the central plane of the drum 10 as with the shaft 26 is parallel with the axis of the drum 10 and (b) that the tape playing deck 20 and the tensioning/rewind device 21 are each movable towards and away from the axis of the shaft 126. Thus to index the transfer device 122 to transpose the two cassette carriers 23 and 24, both the tape playing deck 20 and the tensioning/rewind device 21 are deflected in a direction away from the shaft 126 to the positions shown in broken lines. The device 21 and the tape playing deck 20 are then moved inwards for the tape in one cassette to be run through on the tape deck and for the tape in the other cassette to be rewound. The device 21 is then retracted from the cassette for the latter to be pushed into the drum 10 by the plunger 19*b* and the device 21 stays in the retracted position until the next required cassette has been ejected from the drum 10 by the plunger 19*a*. The device 21 is then moved inwardly and the spindles are rotated to tension the tape in the new cassette. When it is desired to transpose the two carriers 23 and 24, both the tape deck 20 and the device 21 are retracted as described above.

The third embodiment of the present invention is shown in FIGURES 4 to 9 inclusive.

In this embodiment the transfer mechanism 200, the tensioning/rewind device 201 and the tape playing deck 202 are similar to those described in the second embodiment, in that it is the tensioning/rewind device and the tape playing deck which are moved into and out of engagement with a pair of cassettes 203 and 204, which are held in position in the rotatable transfer mechanism 200.

An outer casing 205 is divided into upper and lower compartments by a horizontal member 206, the uppermost of which houses a cam operated transfer mechanism 200, the tensioning/rewind device 201 and the tape playing deck 202. The lower compartment is fitted with an access door 207 on the left hand side of FIGURE 4, and houses an inner removable frame 208 adapted to carry the cassette storage drum 209 and other mechanism to be described later. The inner frame is slid into and out of the outer casing on castors 210.

The cassette storage drum 209 is formed from two annular members 211 and 212 held in spaced relationship by a number of cross members 213. The outer peripheral surface of the members 211 and 212 each carry a chamfered track designed to give a good frictional contact with a tapered rubber roller, one of which is shown at 214. The inner surfaces of the annular members 211 and 212 are provided with grooves 215 slightly offset from the radial, adapted to accept and position the ribs 16 formed on the sides of the cassettes. The grooves 215 are so formed that the cassettes are prevented from being pushed completely through the annular drum. The inner edge of the member 212 is formed into a series of detents 216, the position and number of which corresponds with the position and number of cassettes, which the storage drum 209 is designed to hold.

The drum 209 is rotated by frictional contact with one of the rubber rollers 214 which is driven by motor 217 housed in the upper compartment via a spindle passing through the horizontal member 206. Improved contact is obtained and assured by the other rubber roller 218 being undriven but being pressed against the opposite chamfered track of the other annular member 211 via lever mechanism 219 which is operated by closure of the access door to urge the drum into intimate non-slipping contact with the driving roller 214. Further, elements designated generally under the reference 257 and attached to the outer casing 205 operate a microswitch 258 when the access door is correctly closed. This switch 258, in conjunction with a further switch (not shown) operated when the inner frame is in its correct position, permits a "Stand By" signal to be given and catch 259 locks the inner frame 208 in position against movement by vibration, etc.

Associated with the storage drum 209 and housed on or in the removable inner frame 208 are the read-out device 220 and two microswitches 221 and 222 positioned such that device 220 can monitor the identification elements of each cassette at the outer periphery of the drum, and microswitches 221 and 222 have trip arms which engage the detents 216 in the inner periphery of the drum member 212.

When the drum is loaded with cassettes there is a possibility that the lower cassettes may tend to drop out and this is prevented by two endless chain loops 223 and 224 carried on sets of rollers 225 and 226, one roller of each set being adjustable to tension the associated chain loop. Further fixed guide means 227 and 228 prevent undesirable movement of cassettes above the chain loops. Also the chain loops 223 and 224 support and locate the drum 209.

A ram assembly 229 is housed partly on the outer casing 205 and partly on the inner removable frame 208. The casing 205 carries a drive motor 230, the spindle of which bears a sprocket 231 which is engaged in the operative position with a linear chain section 232 which is adapted to extend and retract a sliding member 233 carried on the outer casing 205. The sliding member 233 engages by means of a peg and slot 259 (when the inner frame 208 is inserted) a telescopic member 234 attached to the inner frame and a corresponding telescopic member 235 is mounted on the other side of the inner frame; the two telescopic elements being connected by means of a cross member 236 which passes through the central aperture of the drum 209. The cross member 236 carries two sets of fingers, firstly a pair of fingers 237 spaced apart such that they can project between the annular members 211 and 212 and act as ejection rams. Secondly, a pair of fingers 238 are attached to the cross member 236 such that they extend outside the annular members 211 and 212 for the full depth thereof and have inwardly curved ends adapted to engage with the outermost edge of the cassette when in the extended position, thus by movement of the cross member 236 a cassette may be ejected from and returned to its slot in the drum 209. A microswitch 239 at the base of the ram assembly controls the limits of the extension and retraction of the ram assembly 229.

The rotatable transfer mechanism 200 comprises a pair of face cams 240 and 241 fixed to a drive shaft 242 which is driven in known manner by a reversible motor 243. The inner surfaces of the face cams are each formed with a cam groove 244 and 245 of such configuration that the sequence of operations to be described later is achieved.

Positioned in the cam groove in each face cam are two pairs of cam followers hereinafter referred to as A and C. The cam followers A control a bracket which carries the tensioning/rewind device 201 while the pair of cam followers C control a supporting bracket for the tape playing deck 202. In addition, the face cam 241 contains an additional cam follower designated B which serves to lock and unlock the tape playing deck 202 situated in its operational position. Situated centrally between the face cams and supported by, but freely rotatable on, the drive shaft 242 are a pair of cassette holders 246 and 247.

Figures 8, 9:
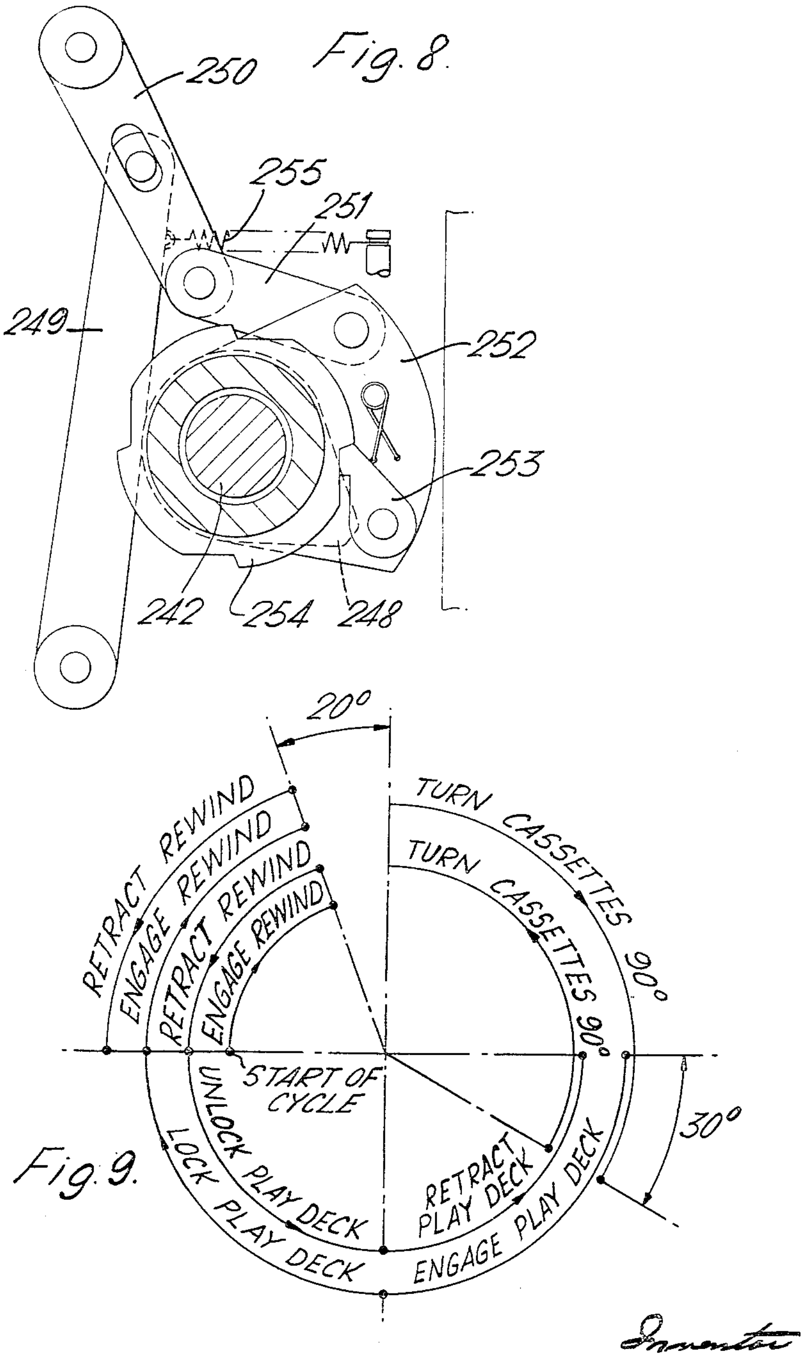
FIGURE 8 is a section along line X—X of FIGURE 7 showing the detail of the rotation of the cassette carriers.
FIGURE 9 is a diagrammatic illustration of the operating cycle of the transfer mechanism in relation to the rotation of the associated driving shaft.

The cassette holders 246 and 247 rotate only in an anticlockwise direction from the tensioning/rewind device to the tape playing deck and returning to the tensioning/rewind device but the driving shaft 242 of the transfer mechanism 200 is adapted to rotate selectively in both directions. This is achieved as shown in FIGURE 8 which is a section on line X—X of FIGURE 7.

The driving shaft 242 has attached to it a cam 248. The driving shaft 242 rotates first in one direction, say anti-clockwise, through approximately 270° and thereby cam 248 moves lever 249 away from the shaft. As lever 249 is pivoted at one end and is attached to lever 250 at its center. Lever 250 also moves about its pivot. The movement of lever 250 also causes movement of lever 251 and thereby movement of plate 252 which carries pawl 253 at one extremity thereof. The pawl 253 is spring biased into contact with a ratchet member 254. In operation, as cam 248 is rigidly fixed to the shaft 242, rotation of this shaft moves lever 249 thereby moving levers 250 and 251, causing plate 252 to be rotated through 90° and as pawl 253 is attached to plate 252 it automatically rotates the ratchet cam 254 through 90°, therefore cam 248 has moved approximately through 270° and as it nears the end of its travel, the linkage 249 to 253 returns to its original position under the influence of spring 255.

The rotation of the drive motor 243 and hence the rotation of the drive shaft 242 is then reversed and cam 248 again operates the linkage 249, 250, 251 and 252 and pawl 253, such as to rotate the ratchet cam 254 through a further 90° in the same direction. Thus the cassette carriers are rotated in the same direction through a total of 180°.

In order to prevent any possibility of counter rotation of the cassette carriers 246 and 247, while the linkage mechanism is returning in order to commence the second rotation of 90°, an additional cam assembly 256 is incorporated allowing free motion in the anti-clockwise direction only.

Referring now to FIGURE 9 which illustrates the operating cycle for the shaft of the transfer mechanism, it will be seen that commencing at the point where the next relevant cassette has been identified by the read-out mechanism 220 and microswitches 221 and 222 rotated to the ejection point then ejected into one of the cassette carriers 246 of the transfer mechanism 202 by the ejection fingers 237 the sequence of operation, is as follows:

(a) The tensioning/rewind device 201 is advanced into engagement with the cassette 203 in cassette holder 246 and the tape is either tensioned or if necessary, rewound, then tensioned. This is accomplished by the face cam assembly rotating in a clockwise direction and moving the cam followers A inwardly along the groove. The tensioning/rewind device stays in this position and also the ram fingers remain extended.

(b) No further action of the transfer mechanism occurs until the tape in the cassette 204 in carrier 247 in the tape playing deck 202 is exhausted, when a signal is made that a change is required.

(c) When it is convenient for the change to occur, the motor 243 driving the transfer mechanism 200 is reversed in rotation such that the cam followers A, B and C move outwardly towards the periphery of the face cam along the groove, this causes (i) the tensioning/rewind device to be retracted,
(ii) the tape playing deck to be unlocked and
(iii) the tape playing deck to be retracted.

During the whole of this period the ram assembly 229 remains extended such that the cassette storage drum 209 cannot be rotated.

(d) Transfer mechanism 200 then rotates the cassette holders 246 and 247 anticlockwise through 180° in two movements each of 90°. During the first 90° the drive shaft 242 is rotating anticlockwise while during the second period of 90° the drive shaft has been reversed and rotates in a clockwise direction. During this movement of the transfer mechanism the cam followers A, B and C stay in the outer part of the groove in the face cams and therefore are inoperative.

(e) The drive shaft 242 continues to rotate in a clockwise direction and the tape playing deck under control of cam followers C is moved inwardly into engagement with the cassette 203 in carrier 246.

(f) Continued rotation in a clockwise direction causes the single cam follower B to operate the tape playing deck lock 256 and the machine then stays at readiness with a signal displayed that a new cassette is ready to be played.

(g) The drive shaft 242 continues to rotate in a clockwise direction and the tensioning/rewind deck is moved into engagement with the cassette 204 in carrier 247 under the control of cam followers A, the rewind deck then commences to rewind and stops at the end of this operation.

(h) The drive shaft 242 then reverses and the tensioning/rewind device is retracted.

(i) The ram mechanism now retracts and the return fingers 238 return the cassette in cassette holder 247 into the storage drum.

(j) When the cassette has been returned to the storage drum an indication either audible, visual or electronic is given that a search is required for a further cassette. The identifying features of the next required cassette may be set up manually, for example, on a series of rotary digital switches or by computer means. When required, the drum is rotated and the cassettes in passing the read-out head 220 are monitored and the relevant cassette is brought to rest at the ram loading point by read-out device 220 in conjunction with microswitches 221 and 222.

(k) The ram mechanism is then extended in order to eject the relevant cassette from the storage drum into the cassette carrier 247.

(l) The tensioning/rewind device is advanced under control of the cam followers A as set out in paragraph *a* above.

If necessary, when the apparatus is at the search phase and the ram assembly is fully retracted the drum assembly 209 can be removed through the access door 207 and those cassettes which are no longer required, removed, and replaced by cassettes which are required for the next period of operation.

Further explanation of the microswitches 221 and 222 may be advantageous. One of these microswitches 222 prevents the read-out head 220 from obtaining a false reading, due to the early operation of some of the identifying features and the late operation of others, therefore the read-out device 220 is not brought into operation until the roller at the end of the trip arm of microswitch 222 has seated at the bottom of the corresponding detent 216.

The other microswitch 221 although engaging with each successive detent 216 is arranged such that an operative signal is not given until the relevant cassette has been identified by the read-out head 220. As soon as this occurs the microswitch 221 operates, first to cause the drum to slow, and first, for the relevant cassette to be positioned co-axially with the ram fingers 237 and the empty cassette carrier contained in the transfer mechanism 200.

What I claim as my invention and desire to secure by Letters Patent is:

1. Data retrieval apparatus comprising: storage means for storing in random order a plurality of tape cassettes, means selectively operable to detect any one of the cassettes, first transfer means, second transfer means controlled by said means to detect cassettes to eject a selected cassette from said storage means into said first transfer means and to inject a cassette from said first transfer means into said storage means, a first station including means for tape tensioning and rewinding, a second station for tape playing, said first transfer means sequentially positioning a selected cassette in juxtaposition with said first station and in juxtaposition with said second station, said tape tensioning and rewinding means tensions the tape in a selected cassette received from said second transfer means, and said tape tensioning and rewinding means rewinds the tape in the cassette after it has been played at said second station, said second transfer means injects the tape cassette into said storage means, said storage means comprises an annular drum including a plurality of substantially radial slots for storing a cassette, each slot including a substantially radial groove to receive a part of the cassette and to guide the cassette during ejection and injection, and said storage means further including a first aperture at its radially outer end through which the cassette is ejected and injected by said second transfer means.

2. Data retrieval apparatus as claimed in claim 1 wherein said drum further includes a second aperture at the inner end of each slot, and said second transfer means includes an ejection member which passes through said second aperture to eject the cassette and an additional injection member which pushes the cassette into the slot through said first aperture.

3. Tape cassette retrieval means as claimed in claim 1 wherein said first station further includes spindles rotatable selectively either in the same direction to rewind the tape or in an opposite direction to tension the tape, and further comprising torque limiting means controlling said spindles.

4. Data retrieval apparatus as claim in claim 3 wherein said torque limiting means include a limited torque motor which selectively is energized in a stalled condition.

5. Data retrieval apparatus as claimed in claim 1 wherein said second transfer means is rotatable and further includes two cassette holders disposed 180° apart in a plane perpendicular to its rotational axis, said first station and said second station are disposed 180° apart in said plane, said first transfer means is rotatable in steps of 180° alternating with stationary periods to transfer simultaneously from said first station to said second station the last ejected cassette and from said second station to said first station the cassette ejected previously, and in alternation with its rotation to remain stationary with one cassette holder at said first station while the other cassette holder is at said second station, said second transfer means is operable when said first transfer means is stationary first to inject a rewound cassette from said first station into said storage means and secondly to eject a cassette from said storage means into said first station.

6. Data retrieval apparatus as claimed in claim 5 further comprising transfer control means including two face cam and a common drive cam supporting said face cams, each face cam including a cam groove on its inner surface; each cam groove containing two cam followers, one cam follower controlling the positioning of the tensioning and rewind means, the other cam follower controlling the positioning of the tape playing deck; one of said cam grooves containing an extra cam follower for locking a cassette into the tape playing deck.

7. Data retrieval apparatus according to claim 6 further comprising a reversible motor for driving said common drive shaft and wherein said face cams rotate uni-directionally as said driving shaft rotates selectively bi-directionally under the control of said reversible motor.

8. Data retrieval apparatus as claimed in claim 1 wherein said second transfer means enables said drum to be removed from the apparatus for some or all of the individual cassettes in said storage means to be manually exchanged for different cassettes.

References Cited

UNITED STATES PATENTS

| | | | |
|---|---|---|---|
| 2,941,738 | 6/1960 | Burke et al. | 242—55.12 |
| 3,168,993 | 2/1965 | Mathieu | 242—55.13 |

LEONARD D. CHRISTIAN, Primary Examiner

U.S. Cl. X.R.

274—11